(12) United States Patent
Athanasiou et al.

(10) Patent No.: US 7,299,644 B2
(45) Date of Patent: Nov. 27, 2007

(54) REFRIGERATOR

(75) Inventors: Athanasios Athanasiou, Giengen (DE); Christian Mayershofer, Grundremmingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/801,957

(22) Filed: Mar. 15, 2004

(65) Prior Publication Data

US 2004/0172956 A1 Sep. 9, 2004

Related U.S. Application Data

(63) Continuation of application No. PCT/EP02/10146, filed on Sep. 10, 2002.

(30) Foreign Application Priority Data

Sep. 13, 2001 (DE) .................. 101 45 146

(51) Int. Cl.
*F25B 49/00* (2006.01)
*G05D 23/32* (2006.01)

(52) U.S. Cl. .................. 62/158; 62/157; 62/132

(58) Field of Classification Search .................. 62/158, 62/157, 132, 161, 163, 231; 236/46 F
See application file for complete search history.

(56) References Cited

U.S. PATENT DOCUMENTS

| 3,709,289 | A |   | 1/1973 | Weatherston |
| 4,490,982 | A |   | 1/1985 | Christmas |
| 4,784,212 | A |   | 11/1988 | Brimer et al. |
| 5,343,712 | A |   | 9/1994 | Gowan |
| 5,802,863 | A | * | 9/1998 | Cowans ................... 62/211 |

FOREIGN PATENT DOCUMENTS

FR    2 759 774 A1    8/1998

* cited by examiner

*Primary Examiner*—Chen-Wen Jiang
(74) *Attorney, Agent, or Firm*—Russell W. Warnock; Craig J. Loest; James E. Howard

(57) ABSTRACT

A refrigerator includes a housing that encloses at least one interior space, a low temperature generator or refrigerating machine for cooling the interior space, and a control device for receiving a target signal and for controlling the temperature of the interior space to a target temperature represented by the target signal, by controlling the operation of the refrigerating machine. A control element supplies the target signal to the control device with a level that varies in accordance with a predetermined course.

16 Claims, 2 Drawing Sheets

REFRIGERATOR

CROSS-REFERENCE TO RELATED APPLICATION

This application is a continuation, under 35 U.S.C. § 120, of copending International Application No. PCT/EP02/10146, filed Sep. 10, 2002, which designated the United States; this application also claims the priority, under 35 U.S.C. § 119, of German Patent Application 101 45 146.6, filed Sep. 13, 2001; the prior applications are herewith incorporated by reference in their entirety.

BACKGROUND OF THE INVENTION

Field of the Invention

The invention relates to a refrigerator that is suitable, in particular, for cooling food such as wine, the quality of which is highly dependent on climatic conditions of its storage.

The long-term storage of wines typically occurs in cellars, the temperature of which is generally not the optimal drinking temperature of the wines. In the case of many white wines and sparkling wine, the optimal drinking temperature is typically lower than the cellar temperature, whereas for red wines it can be higher. In order to bring the wines to drinking temperature, they are frequently placed in a refrigerator for chilling, where they are abruptly cooled to the internal temperature of the refrigerator, or they are placed in an inhabited room where they can warm to the temperature there. However, those kinds of sudden temperature changes are precisely what must be avoided in the long-term storage of wines in cellars, and they can adversely affect wine quality.

SUMMARY OF THE INVENTION

It is accordingly an object of the invention to provide a refrigerator, which overcomes the hereinafore-mentioned disadvantages of the heretofore-known devices of this general type and with which wines can be brought to their optimal drinking temperature gently and without degrading their quality.

With the foregoing and other objects in view there is provided, in accordance with the invention, a refrigerator. The refrigerator comprises a housing surrounding at least one interior space. A low temperature generator cools the interior space. A control device receives a target value signal and controls a temperature of the interior space to a target temperature represented by a target value signal, by controlling operation of the low temperature generator. A control element sends the target value signal to the control device with a level varying according to a prescribed course.

Refrigerators are typically constructed only to maintain a constant internal temperature that is selectable by the user in advance. In contrast, the refrigerator according to the invention has the ability, through the use of a control element, to generate a temperature that changes over time according to a prescribed course or progression, thereby allowing a gentle heating or chilling of wines.

In accordance with another feature of the invention, the progression is advantageously defined in such a way that it controls a temperature change at a constant rate on average until a final temperature is attained, which corresponds to the optimal drinking temperature of the wines.

In accordance with a further feature of the invention, the prescribed progression can be partitioned into a number of stages that run in succession. The level of the target value signal, and thus the target temperature it represents, remain constant in the course of a stage.

In accordance with an added feature of the invention, the final target temperature that is attained at the end of the progression is settable by a user, who can define it according to the respective wine variety or according to his or her personal taste.

In accordance with an additional feature of the invention, an average rate of change of the target temperature during the progression is also definable by a user, so that he or she can set an optimally gentle tempering or temperature modification progression within an available time period. The defining of the average rate of change can be accomplished directly by the input of a numeric value for the rate of change. It is also conceivable for the user to specify a time period that is available for the tempering progression, and then the refrigerator calculates the required average rate of change automatically.

In accordance with a concomitant feature of the invention, the rate of change can be between 0.5 and 3 K/h.

Other features which are considered as characteristic for the invention are set forth in the appended claims.

Although the invention is illustrated and described herein as embodied in a refrigerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
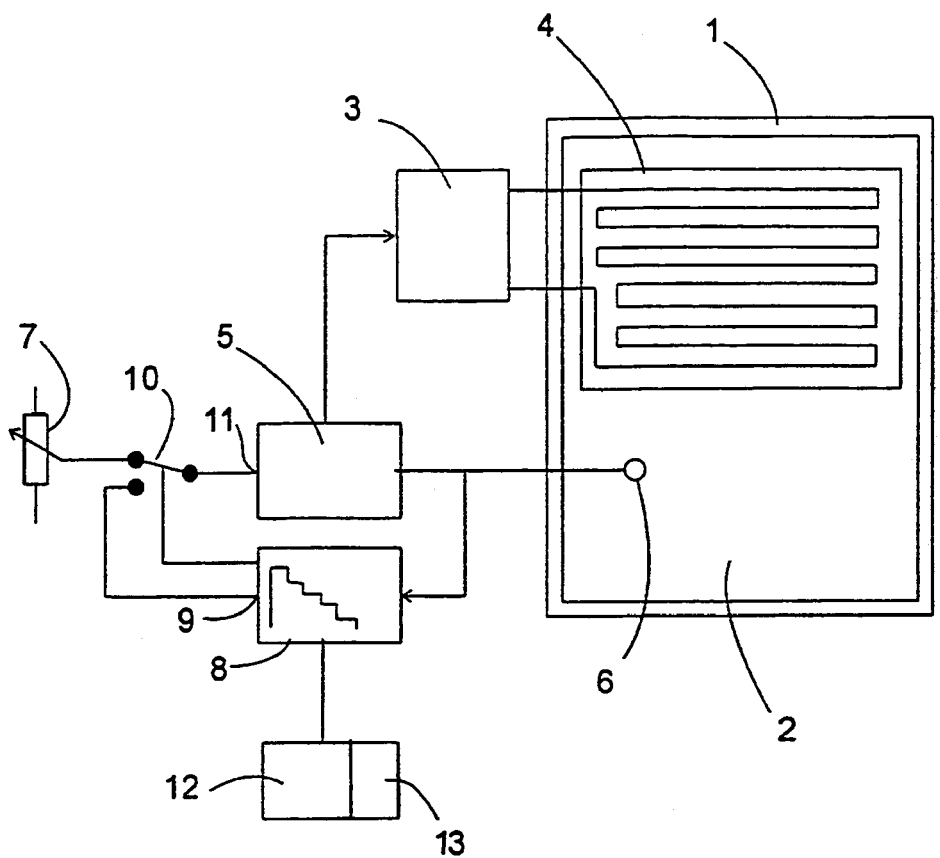
FIG. 1 is a block diagram of a refrigerator according to the invention.

Referring now to the figures of the drawings in detail and first, particularly, to FIG. 1 thereof, there is seen a diagrammatically illustrated refrigerator which includes a housing 1 that surrounds an interior space 2, a low temperature generator or refrigerating machine 3 with an evaporator 4 which is attached to an inner wall of the housing 1 for cooling the interior space 2, and a thermostat control device 5 for controlling the operation of the low temperature generator 3 with the aid of a temperature that is detected by a temperature sensor 6 in the interior space 2. A controller 7, at which a user can set a target or set-point temperature of the interior space 2, is connected to the control device 5. This construction of a refrigerator is generally known, and its function need not be elaborated on herein.

A control element 8 has a signal input that is connected to the temperature sensor 6. A target value signal output 9 of the control element 8 is connectable to a target value signal input 11 of the control device 5 instead of the controller 7, through the use of a switch 10. In the illustrated position, the switch 10 is connecting the target value signal input 11 to the controller 7. This corresponds to an operating mode of the refrigerator in which a target temperature that has been set by the user at the controller 7 is maintained in the interior space 2 on a constant basis in the usual manner.

The control element 8 is connected to a user interface 12 at which a user can input a command for changing from a mode with a constant internal temperature to a tempering or moderating mode, for example. When such a command is input, the control element 8 switches the switch 10, so that the target value signal input 11 of the control device is connected to the target value signal output 9 of the control element 8. Next, the control element 8 begins to output a target value signal with a time characteristic corresponding to a prescribed rate of change of the temperature of the interior space and to a prescribed final temperature. The rate of change can be 1 K/h, for example. The control element 8 initially sends a target value signal corresponding to a target temperature that is below the interior space temperature detected by the temperature sensor 6 by a predetermined increment, for instance 0.1 K, and the control device 5 drives the low temperature generator 3 to achieve this target temperature. After a period that is defined by the increment and the rate of temperature change, a period of 6 minutes in this case, the control element 8 reduces the target value signal by 0.1 K again. The course or progression of the target value signal is represented by a solid line 15 in FIG. 2. The resulting interior temperature corresponds to a dotted curve 16.

The incremental reduction of the temperature is continued until a predetermined final temperature is achieved. The interior space 2 is held at that temperature on a constant basis until a user enters a command to return to the operating mode with the temperature that was set at the controller 7. That is done, in particular, after the user removes the wine which has been tempered or moderated, that is brought to the correct temperature for drinking, from the interior space.

The temperature that is set at the controller 7 preferably corresponds to the temperature of the cellar from which the wine bottles are taken for tempering or moderating in the refrigerator. This temperature can be measured by the user in the cellar and set at the controller 7 manually. The controller 7 can alternatively be replaced by a temperature sensor that is disposed directly in the cellar. Since the refrigerator will usually not be kept in the same cellar as the wine, it is expedient to provide a radio link, for example, for communicating the temperature measurement value.

The above-described example is based on the assumption that a rate of temperature change and a final temperature have been prescribed at the control element 8. This prescribing can be carried out by the manufacturer, although it is preferable, particularly in the case of the final temperature, that it be able to be input by the user at the interface 12 and able to be stored at the control element 8, so that repeated tempering processes with the same temperature characteristic can be performed without repeating the setting operation.

The rate of temperature change can also be specifiable by a user at the interface 12. This can be performed, for instance, by the direct input of a numeric value for the rate of change or by the input of a time period that is available for the tempering progression, from which the control element 8 automatically computes the required rate of change.

A display element 13, particularly an electroluminescent display element, can be provided for the purpose of indicating to a user that the prescribed temperature progression has run to completion, and the final temperature has been reached. Such a display element has the function, on one hand, of visually notifying the user that the wine that is stored in the refrigerator has reached optimal drinking temperature and can be removed. On the other hand, after the wine has been removed, it can remind the user to input a command to return to constant temperature mode, in which the refrigerator sets the interior space to the cellar temperature again so that the interior space can be refilled. The display element 13 may be part of the user interface 12 as shown or it may be connected to the control element 8 or the temperature sensor 6.

Clearly, the refrigerator according to the invention can also include a number of interior spaces having temperatures which are individually controllable. In that way, different varieties of wine can accordingly be tempered or modified in temperature for drinking, in one refrigerator.

Figure 2:
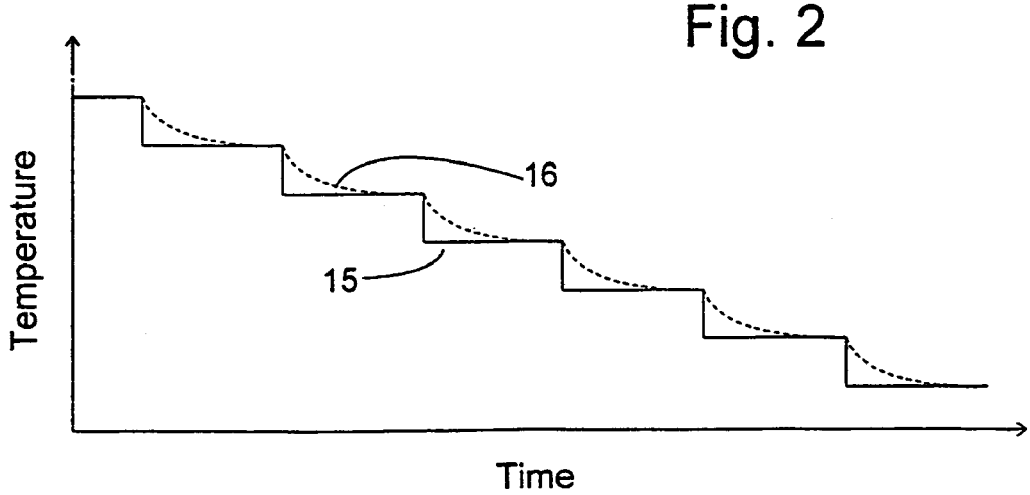
FIG. 2 is a graph showing a example of a time progression of a target temperature and a resulting actual internal temperature of the refrigerator.

Instead of careful or cautious cooling as represented in FIG. 2, the refrigerator can also be used for careful or cautious heating, in which case it can be advantageous to equip the interior space with a heating unit. Otherwise, the tempering or temperature modification progression, due to the customary thermal insulation of the interior space, can take a very long time, particularly its final phase when the difference between the temperature of the interior space and the ambient temperature of the refrigerator becomes progressively smaller.

Figure 3:
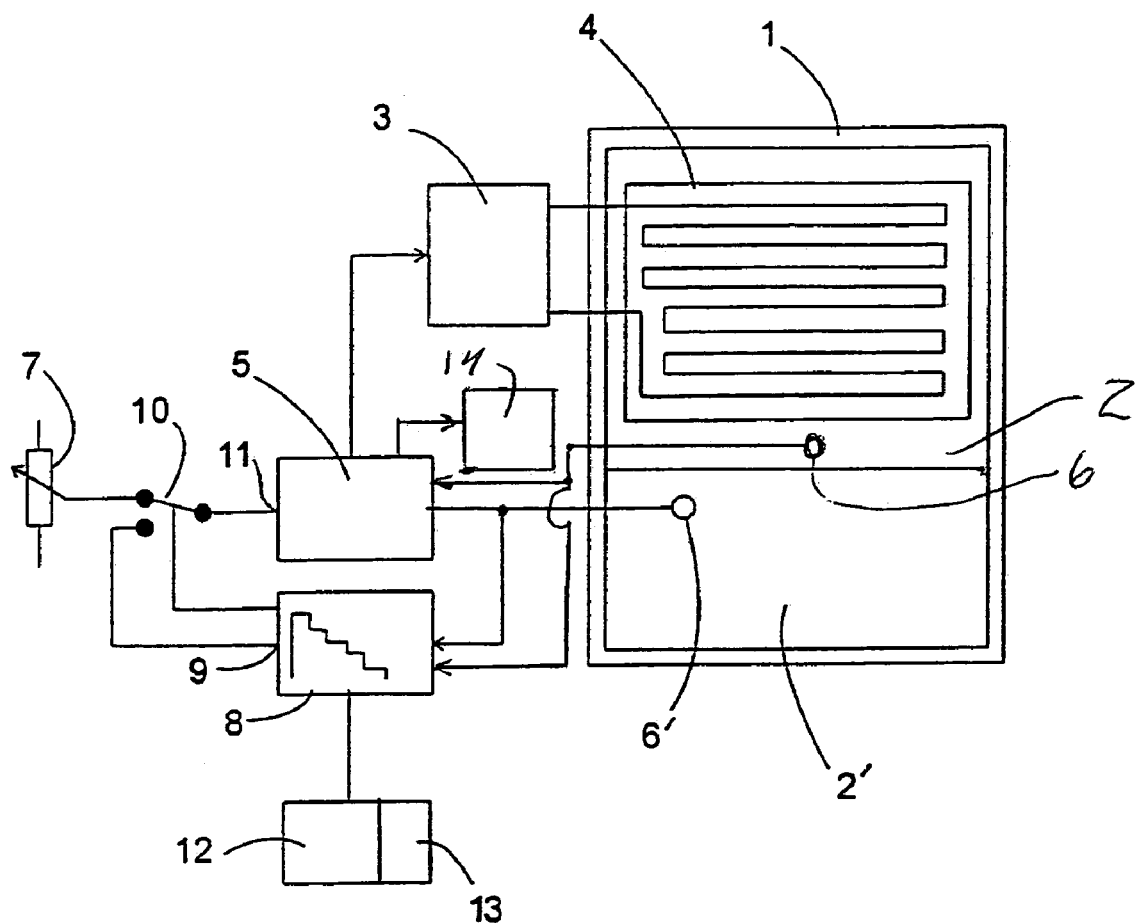
FIG. 3 is a block diagram of a refrigerator according to another embodiment of the invention.

One embodiment of a refrigerator of the present invention, illustrating both a plurality of interior spaces 2, 2' and a heating unit 14 is shown in FIG. 3. The refrigerator in FIG. 3 is substantially identical to the refrigerator in FIG. 1, with the addition of the interior spaces 2, 2' and the heating unit 14. Although the interior spaces 2, 2' could both be different cooling spaces, as illustrated, the space 2' has a separate temperature sensor 6' and is coupled (not illustrated) to the heater or heating unit 14 to provide a separate red wine tempering or warming space. In operation, the interior spaces 2, 2' can be individually controllable and can be coupled as shown to both the cooling and heating units 3, 14. The interior spaces 2, 2' also both can be coupled to either the cooling unit 3 or to heating unit 14. The interior spaces 2, 2' then can be individually controllable either to cool both spaces 2, 2' or to heat both spaces 2, 2'. Although only two separate spaces 2, 2' are illustrated, there is no particular limit on the plurality of separate spaces in accordance with the invention.

We claim:

1. A refrigerator for changing the temperature of wine from a starting temperature to a final temperature, comprising:

a housing surrounding at least one interior space for receiving a container of wine;

a low temperature generator for cooling said interior space;

a control device for receiving a target value signal and controlling a temperature of said interior space to a target temperature represented by said target value signal, by controlling operation of said low temperature generator;

a control element sending said target value signal to said control device with a level varying according to a prescribed course to the final temperature, wherein said prescribed course includes a number of steps; and at least a first and a second interior space and said low temperature generator is coupled to both of said interior spaces and the temperature within each of said interior spaces is controlled independently.

2. The refrigerator according to claim 1, wherein said prescribed course controls a monotonic fall or rise of said target temperature.

3. The refrigerator according to claim 2, wherein said prescribed course controls a temperature change at a constant rate on average until the final temperature is reached.

4. The refrigerator according to claim 3, wherein said rate is between 0.5 and 3 K/h.

5. The refrigerator according to claim 1, wherein each step is with a constant level during that step.

6. The refrigerator according to claim 1, which further comprises an operating element associated with said control element for permitting a user to specify the final temperature at an end of said prescribed course.

7. The refrigerator according to claim 1, which further comprises an operating element associated with said control element for permitting a user to specify a mean rate of change of said target temperature during said prescribed course.

8. The refrigerator according to claim 7, wherein said rate is between 0.5 and 3 K/h.

9. The refrigerator according to claim 1, which further comprises a display element for indicating that an end of said prescribed course has been achieved.

10. The device according to claim 1, wherein the prescribed course controls a monotonic change of the target temperature including a number of steps having a substantially constant level during each step.

11. The device according to claim 1, further comprising a user interface and display element connected to the control element and receiving a user input for the final temperature.

12. The device according to claim 1, further comprising a user interface and display element connected to the control element and receiving a user input for the rate change.

13. A refrigerator for changing the temperature of wine from a starting temperature to a final temperature, comprising:

a housing surrounding at least one interior space for receiving a container of wine;

a low temperature generator for cooling said interior space;

a control device for receiving a target value signal and controlling a temperature of said interior space to a target temperature represented by said target value signal, by controlling operation of said low temperature generator;

a control element sending said target value signal to said control device with a level varying according to a prescribed course to the final temperature, wherein said prescribed course includes a number of steps; and at least a first and a second interior space and a heating temperature generator coupled to both of said interior spaces and the temperature within each of said interior spaces is controlled independently.

14. A refrigerator for changing the temperature of wine from a starting temperature to a final temperature, comprising:

a housing surrounding at least one interior space for receiving a container of wine;

a low temperature generator for cooling said interior space;

a control device for receiving a target value signal and controlling a temperature of said interior space to a target temperature represented by said target value signal, by controlling operation of said low temperature generator;

a control element sending said target value signal to said control device with a level varying according to a prescribed course to the final temperature, wherein said prescribed course includes a number of steps; and at least a first and a second interior space and said low temperature generator coupled to both of said interior spaces and a heating temperature generator coupled to both of said interior spaces, only one of said low temperature generator and said heating temperature generator operationally coupled to said first and second interior spaces at one time.

15. The refrigerator according to claim 14, including an operating element associated with said control element for permitting a user to specify the final temperature at an end of said prescribed course for either or both of said low temperature generator and said heating temperature generator.

16. The refrigerator according to claim 15, including an operating element associated with said control element for permitting a user to specify a mean rate of change of said target temperature during said prescribed course for either or both of said low temperature generator and said heating temperature generator.

* * * * *